United States Patent
Lee et al.

(10) Patent No.: US 7,389,924 B2
(45) Date of Patent: Jun. 24, 2008

(54) ELECTRONIC CARD CONNECTOR

(75) Inventors: Ipson Lee, Taoyuan (TW); Joey Chang, Chung-Lee (TW)

(73) Assignee: Super Link Electronics Co., Ltd., Taoyuan (TW)

( * ) Notice: Subject to any disclaimer, the term of this patent is extended or adjusted under 35 U.S.C. 154(b) by 448 days.

(21) Appl. No.: 11/090,180

(22) Filed: Mar. 28, 2005

(65) Prior Publication Data

US 2006/0213990 A1  Sep. 28, 2006

(51) Int. Cl.
*G06K 19/06* (2006.01)
(52) U.S. Cl. .................................. 235/441; 235/483
(58) Field of Classification Search ............. 235/441, 235/483
See application file for complete search history.

(56) References Cited

U.S. PATENT DOCUMENTS

| | | | |
|---|---|---|---|
| 6,655,590 B1 | 12/2003 | McFeely et al. | |
| 6,783,926 B2 * | 8/2004 | Reece | 430/630 |
| 7,137,562 B2 * | 11/2006 | West et al. | 235/486 |
| 2004/0050938 A1 * | 3/2004 | Yamaguchi | 235/483 |
| 2006/0076410 A1 * | 4/2006 | Ko et al. | 235/441 |
| 2006/0273173 A1 * | 12/2006 | Ho | 235/441 |

* cited by examiner

*Primary Examiner*—Michael G. Lee
*Assistant Examiner*—Allyson N Trail
(74) *Attorney, Agent, or Firm*—Rosenberg, Klein & Lee

(57) ABSTRACT

An electronic card connector including a plastic main body having a carrier board section. An electronic card receiving region is defined between two electronic card receiving channels. An entrance of the electronic card receiving region is formed at front end of the plastic main body. A circuit board is mounted between the sidewalls of the plastic main body. The circuit board includes multiple contact terminals extending into the electronic card receiving region for contacting with a corresponding contact of the chip of an electronic card inserted in the electronic card receiving region. The circuit board further includes multiple adaptive terminals. A first end of each adaptive terminal is connected to a corresponding contact terminal via a printed circuit. A second end of the adaptive terminal is connected with a circuit board of the card reader or plugged in a socket of the circuit board of the card reader.

9 Claims, 9 Drawing Sheets

ELECTRONIC CARD CONNECTOR

BACKGROUND OF THE INVENTION

1. Field of the Invention

The present invention is related to an electronic card connector including a plastic main body. A circuit board is inserted in a circuit board receiving region of the plastic main body. The circuit board includes multiple contact terminals extending into an electronic card receiving region of the plastic main body for contacting with a corresponding contact of an electronic card inserted in the electronic card receiving region. Multiple adaptive terminals are further connected with an edge of the circuit board. A first end of each adaptive terminal is connected to a corresponding contact terminal via a printed circuit.

2. Description of the Prior Art

The existent electronic IC chip cards (smart cards) have been widely applied to electronic ticket, identification card, etc. After the smart card is inserted into a card reader, the data of the card can be identified, accessed or replaced.

U.S. Pat. No. 6,655,590 discloses a card reader having a frame 30. The frame 30 is formed with a card slot 50 and multiple mounting notches 44. A signal contact 22 is correspondingly inlaid in each mounting notch 44. A curved connection surface 24 of front end of the signal contact resiliently extends into the card slot 50 for electrically connecting with the inserted electronic card. The other end of the signal contact 22 is formed with a tail 26 which is soldered on the circuit board of a card reader 10. In assembling procedure of the card reader 10, the signal contacts 22 must be one by one soldered on the circuit board. Such procedure is inconvenient and time-consuming. In addition, after a period of use, the signal contacts 22 tend to resiliently fail or deform. Under such circumstance, the signal contacts can hardly tightly attach to the inserted electronic card. Therefore, it is necessary to repair the card reader. However, the signal contacts are directly soldered on the circuit board. When repaired, it is necessary to melt the solder of the soldering sections of the signal contacts and then take off and replace the signal contacts 22. Such procedure is quite inconvenient.

SUMMARY OF THE INVENTION

It is therefore a primary object of the present invention to provide an electronic card connector including:

a plastic main body having a carrier board section, two sidewalls being respectively connected with two sides of the carrier board section, a pair of electronic card receiving channels being respectively oppositely formed on the two sidewalls, an electronic card receiving region being defined between the electronic card receiving channels of the two sidewalls, an entrance of the electronic card receiving region being formed at front end of the plastic main body; and a circuit board disposed between the sidewalls of the plastic main body, multiple contact terminals being connected with the circuit board, one end of each contact terminal extending into the electronic card receiving region for contacting with a corresponding contact of an electronic card inserted in the electronic card receiving region, multiple adaptive terminals being disposed on one edge of the circuit board, a first end of each adaptive terminal being connected to a corresponding contact terminal via a printed circuit, a second end of the adaptive terminal being connected with a circuit board of the card reader or plugged in a socket of the circuit board of the card reader.

The present invention can be best understood through the following description and accompanying drawings wherein:

DETAILED DESCRIPTION OF THE PREFERRED EMBODIMENTS

Figure 1:
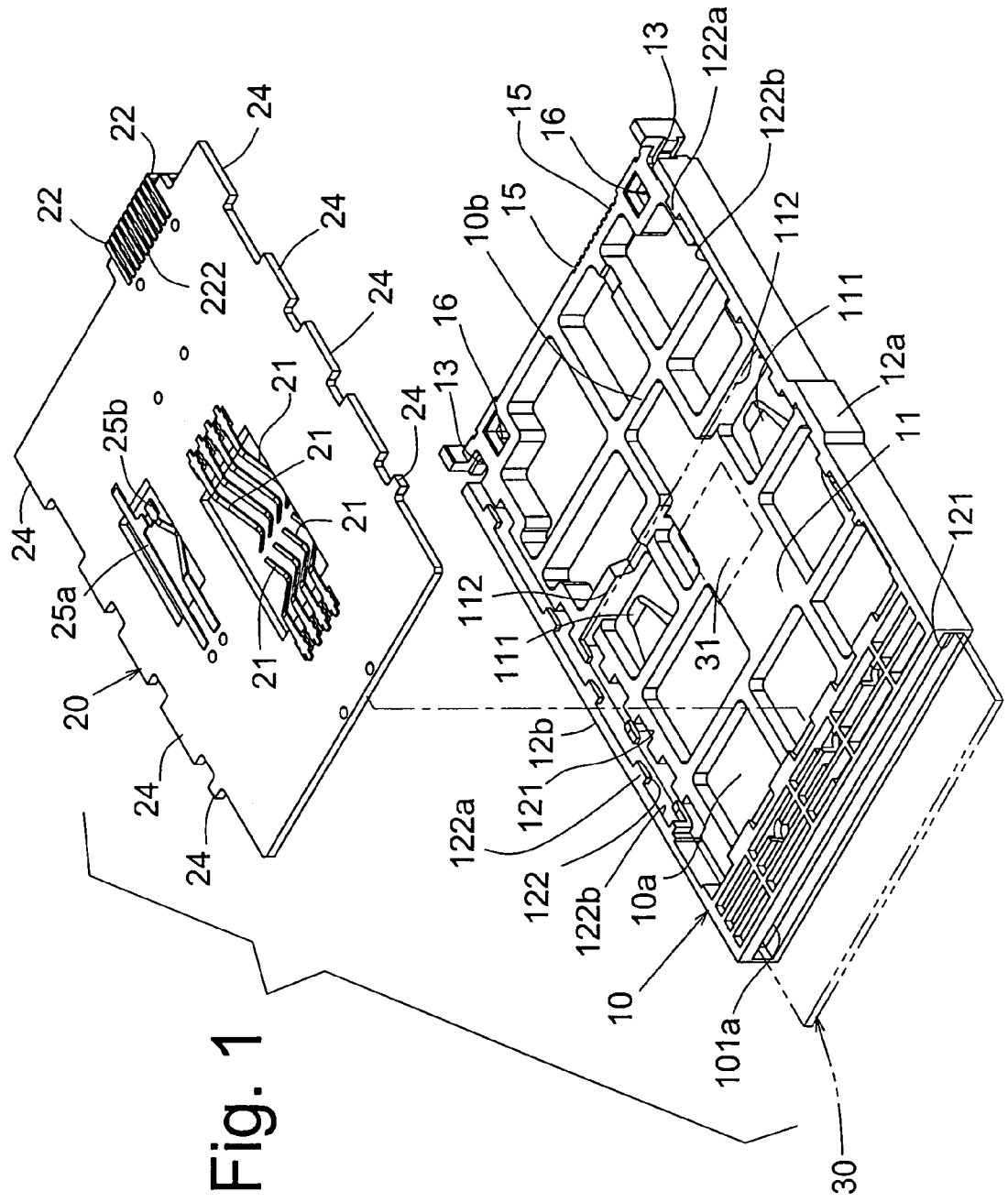
FIG. 1 is a perspective exploded view of the plastic main body and the circuit board of the present invention.

Please refer to FIGS. 1 to 9. The electronic card connector of the present invention includes a plastic main body 10 having a carrier board section 11. Two sidewalls 12a, 12b are respectively connected with two sides of the carrier board section 11. A pair of electronic card receiving channels 121 are respectively oppositely formed on the two sidewalls 12a, 12b. An electronic card receiving region 10a is defined between the electronic card receiving channels 121 of the two sidewalls 12a, 12b. An entrance 101a of the electronic card receiving region 10a is formed at front end of the plastic main body 10. A circuit board receiving region 10b is defined between the two sidewalls 12a, 12b. The electronic card connector further includes a circuit board 20 mounted in the circuit board receiving region 10b. Multiple contact terminals 21 are connected with the circuit board 20. One end of each contact terminal 21 extends into the electronic card receiving region 10a for contacting with a corresponding contact of the chip 31 of an electronic card 30 inserted in the electronic card receiving region 10a. Multiple adaptive terminals 22 are disposed on one edge of the circuit board 20. A first end 221 of each adaptive terminal 22 is connected to a corresponding contact terminal 21 via a printed circuit 220 (as shown by phantom line of FIG. 9). A second end 222 of the adaptive terminal 22 is connected with a circuit board of the card reader (not shown) or plugged in a socket of the circuit board of the card reader.

Referring to FIG. 1, at least one resilient arm 111 is disposed on the carrier board section 11 of the plastic main body 10. The resilient arm 111 always pushes the electronic card 30 inserted in the electronic card receiving region 10a toward the circuit board 20. Accordingly, the contacts of the chip 31 of the electronic card 30 are tightly attached to the contact terminals 21 of the circuit board 20. A stop shoulder 112 is formed at bottom end of the electronic card receiving region 10a for stopping the electronic card 30 from being further inserted.

The electronic card connector of the present invention is not only applicable to the smart card. The electronic card connector is also applicable to any other similar electronic IC chip card. The application of the electronic card connector of the present invention is not limited.

The circuit board 20 can be bridged between the sidewalls 12a, 12b of the plastic main body 10 and fixed in a circuit board receiving region 10b defined therebetween. Alternatively, the circuit board 20 can be slidably disposed in a circuit board slide slot 122 defined between the sidewalls 12a, 12b. The measure for fixing the circuit board 20 with the plastic main body 10 is not limited.

Figure 2:
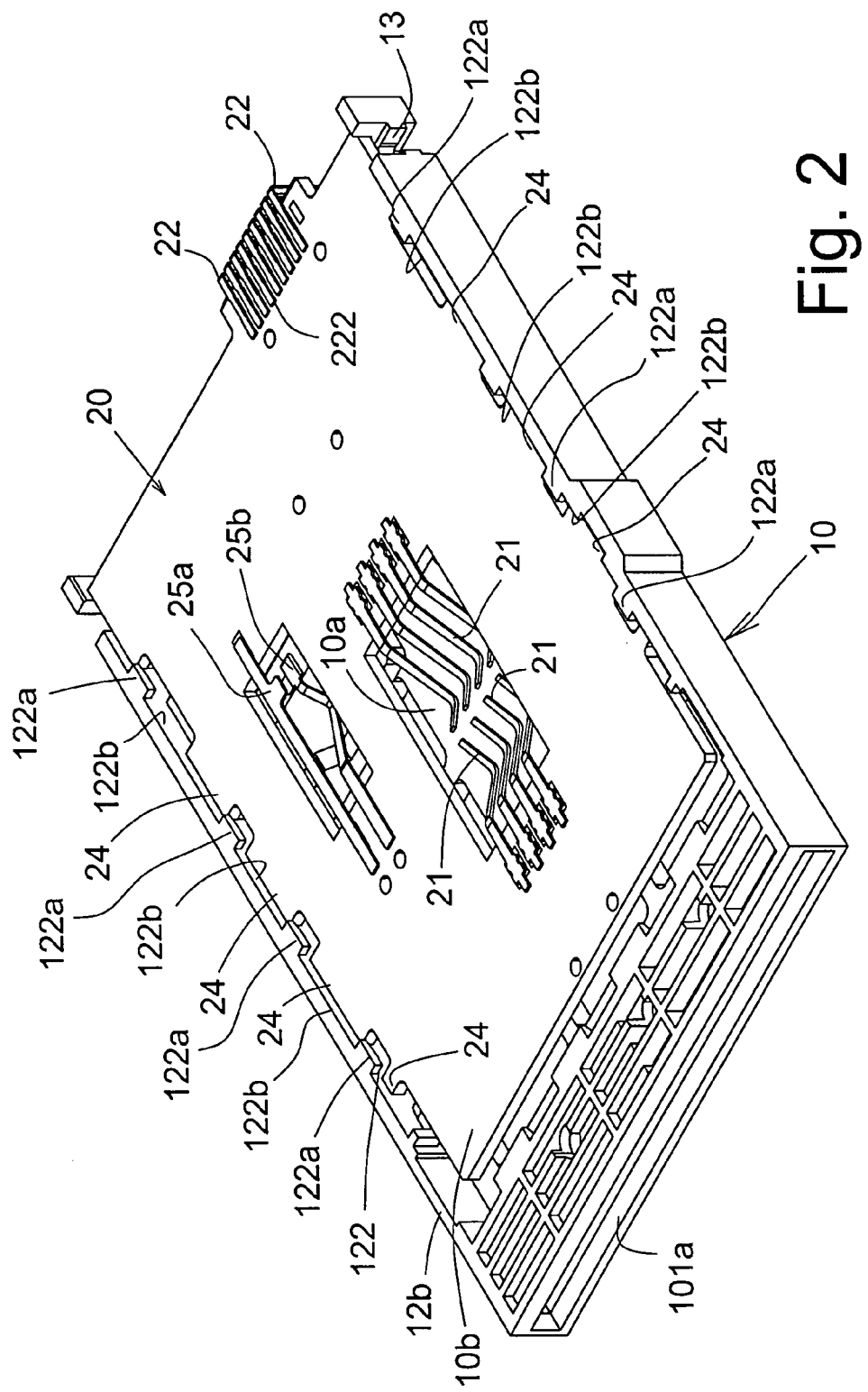
FIG. 2 is a perspective assembled view according to FIG. 1, in which the circuit board is laid on the plastic main body.
Figure 3:
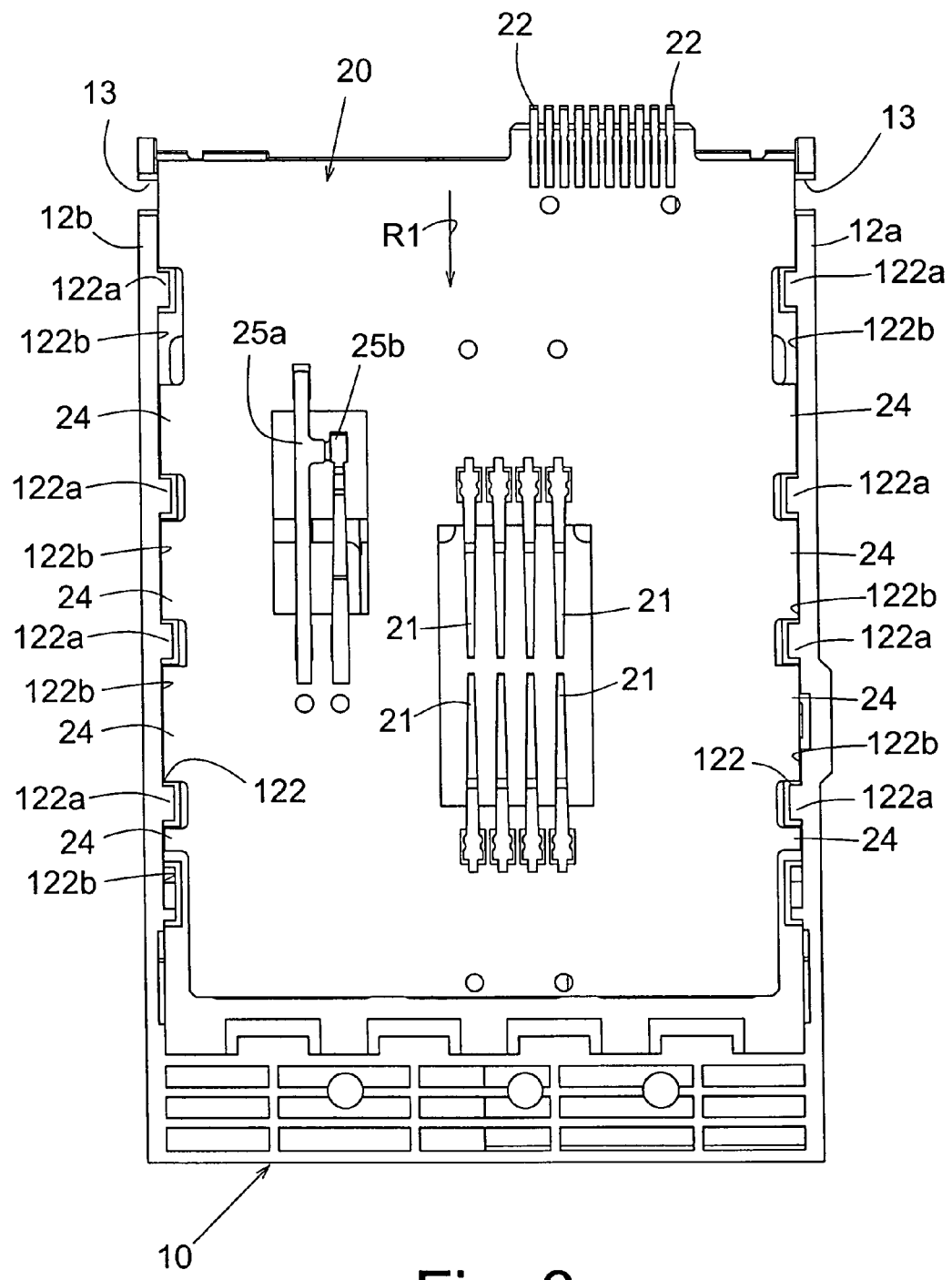
FIG. 3 is a top view according to FIG. 2.
Figure 4:
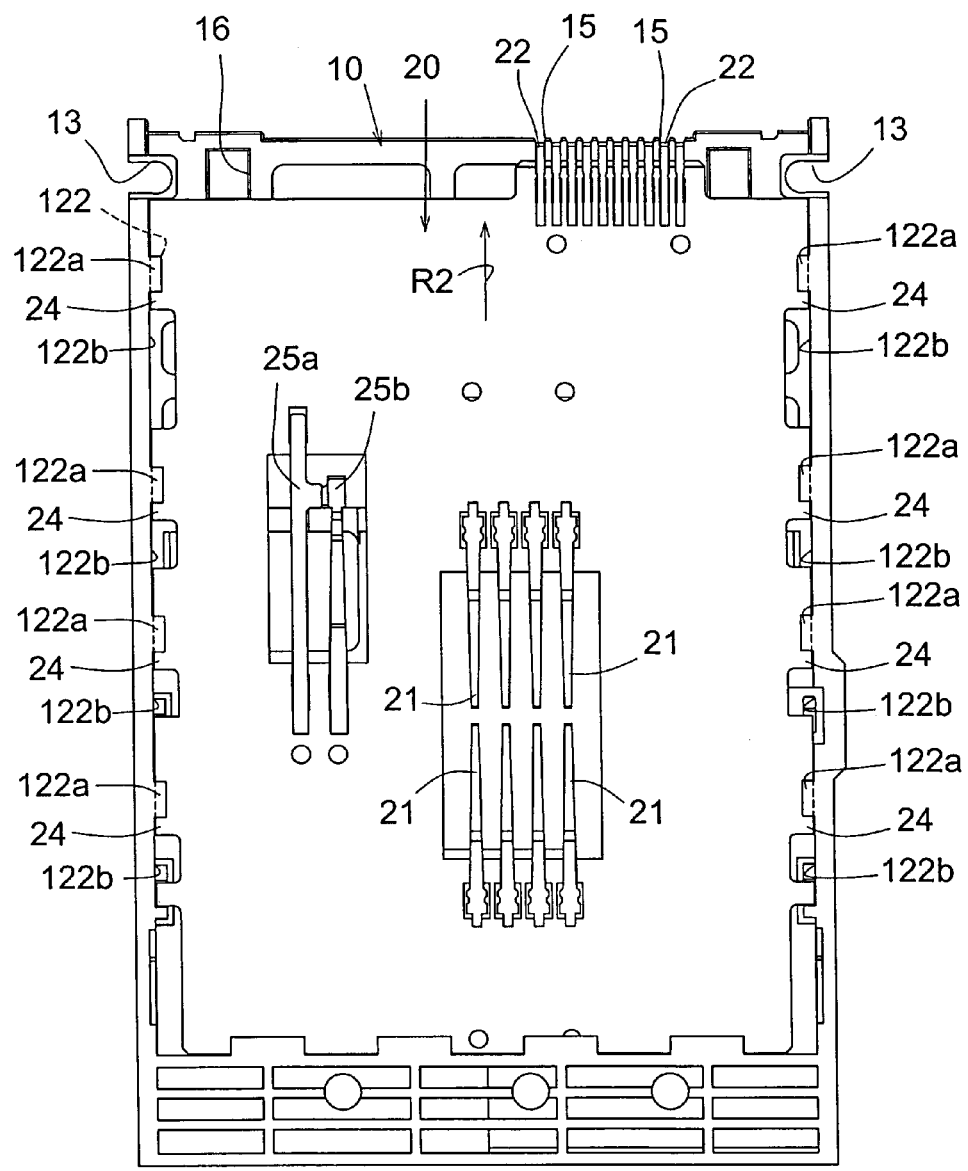
FIG. 4 is a view according to FIG. 3, in which the tongue plates of the circuit board are pushed into the second slide channel.
Figure 5:
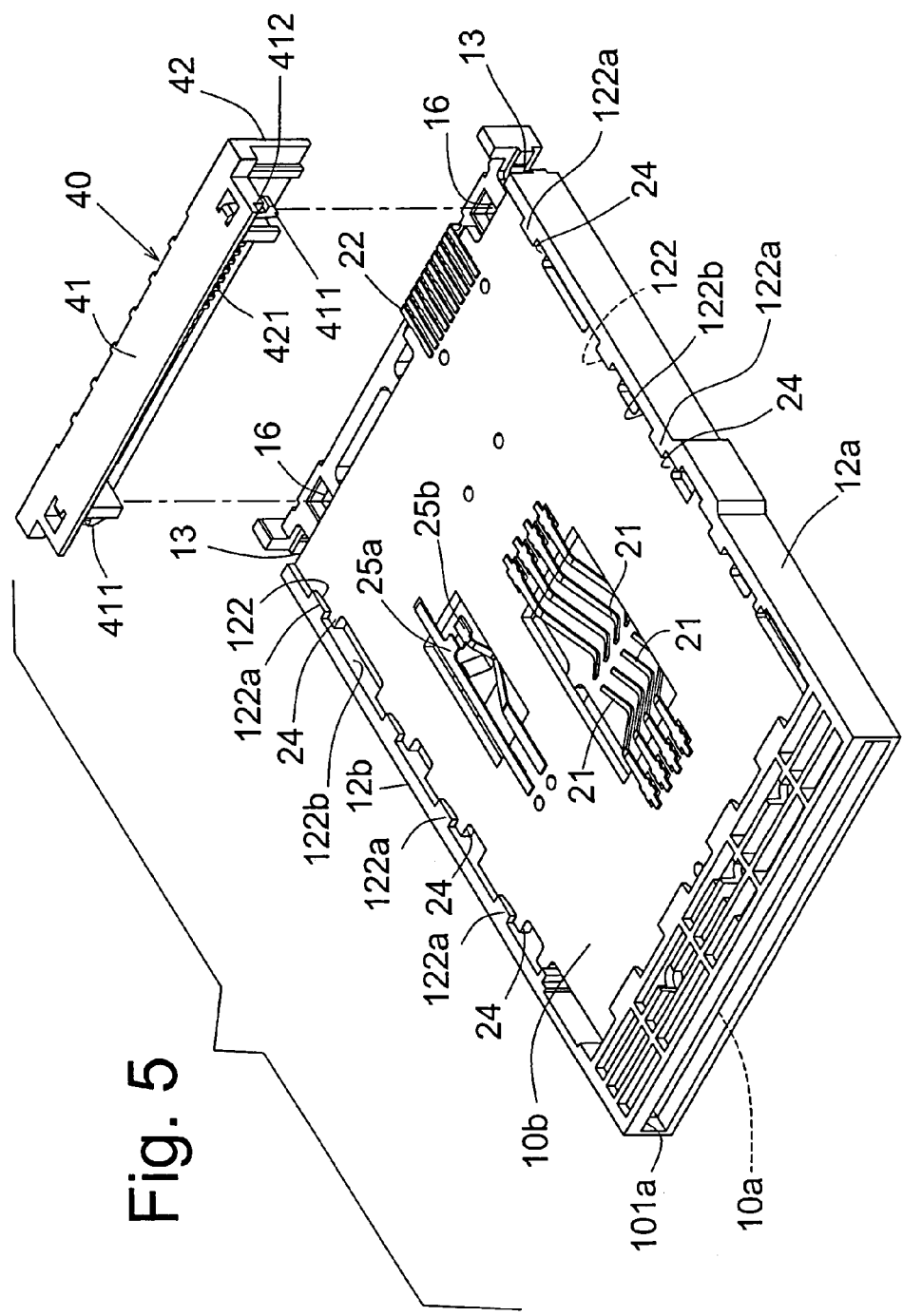
FIG. 5 is a perspective view showing that a fixing member is assembled with the plastic main body of the present invention.

Referring to FIGS. 1 to 5, the upper channel wall 122a of each second slide channel 122 of the sidewall 12a, 12b of the plastic main body 10 is recessed from inner edge to form at least one recessed section 122b. Each lateral edge of the circuit board 20 is formed with at least one projecting tongue plate 24. The tongue plate 24 can be projectively fitted into the recessed section 122b of the second slide channel 122 (as shown in FIGS. 2 and 3). With the tongue plates 24 of the circuit board 20 aligned with the second slide channels 122, the circuit board 20 can be slid along the second slide channel 122 in a direction R1 through a certain distance. Thereafter, the tongue plates 24 are pressed by the upper channel walls 122a of the second slide channels 122 and firmly located in the second slide channels 122 as shown in FIGS. 4 and 5. When a user desires to detach the circuit board 20, the circuit board 20 is pushed in a direction R2 of FIG. 4 to move the tongue plates 24 to the positions right under the recessed sections 122b (as shown in FIG. 3). Under such circumstance, the circuit board 20 can be upward taken out. Accordingly, it is convenient and fast to install and detach the circuit board 20.

Figure 7:
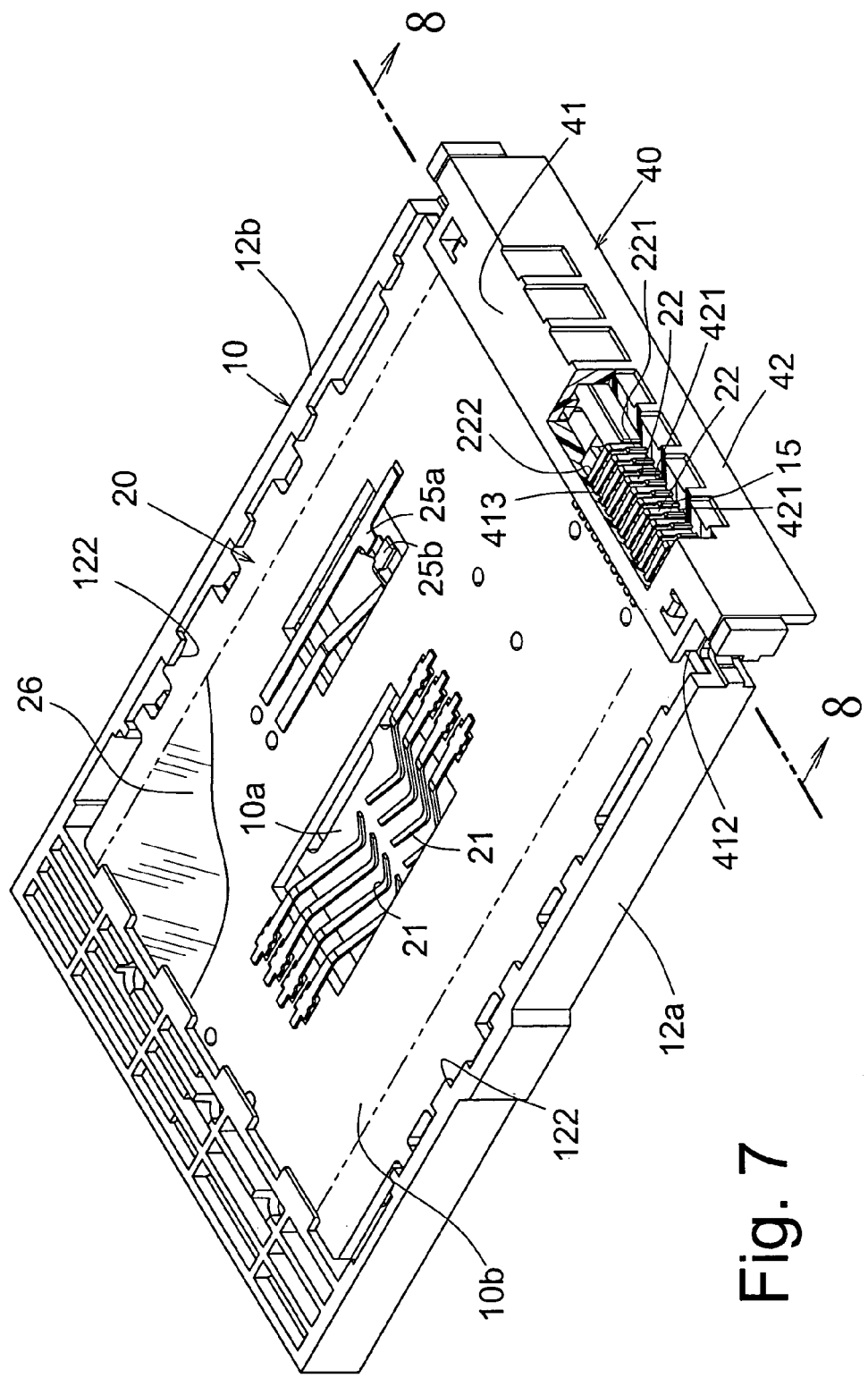
FIG. 7 is a partially sectional perspective view showing the fixing member of the present invention.
Figure 8:
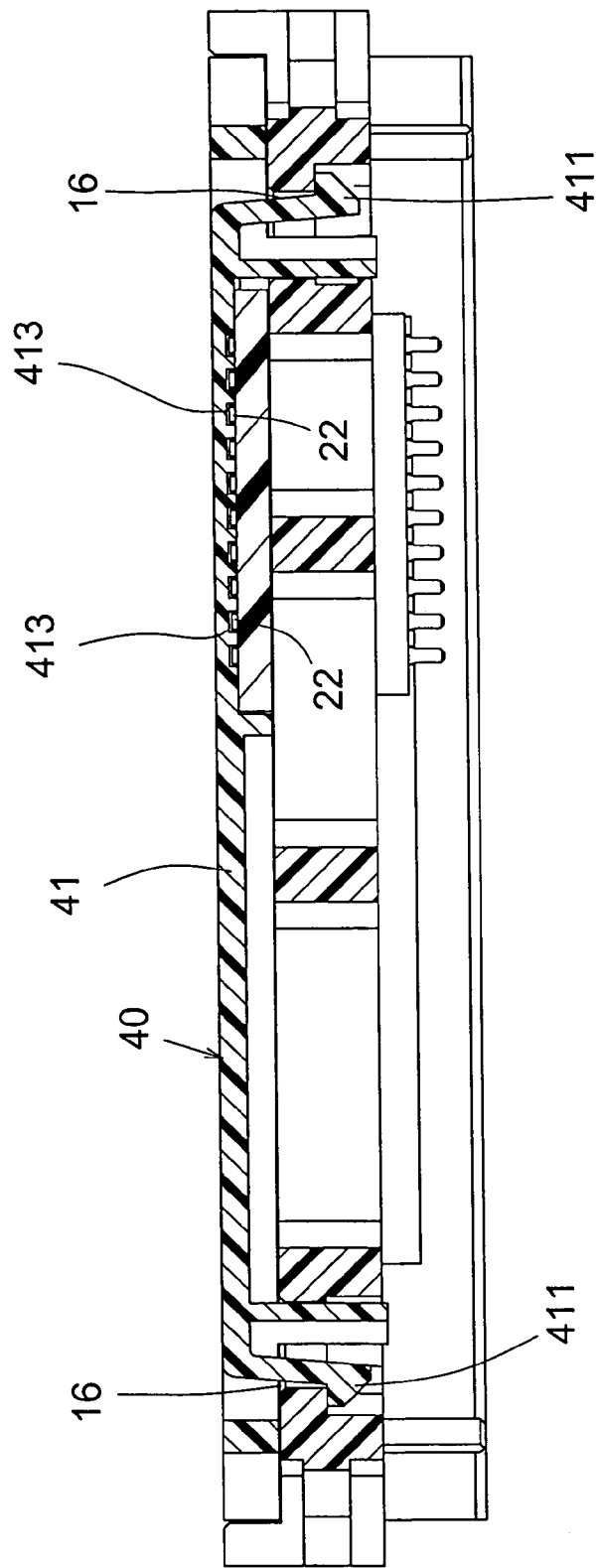
FIG. 8 is a sectional view taken along line 8-8 of FIG. 7.
Figure 9:
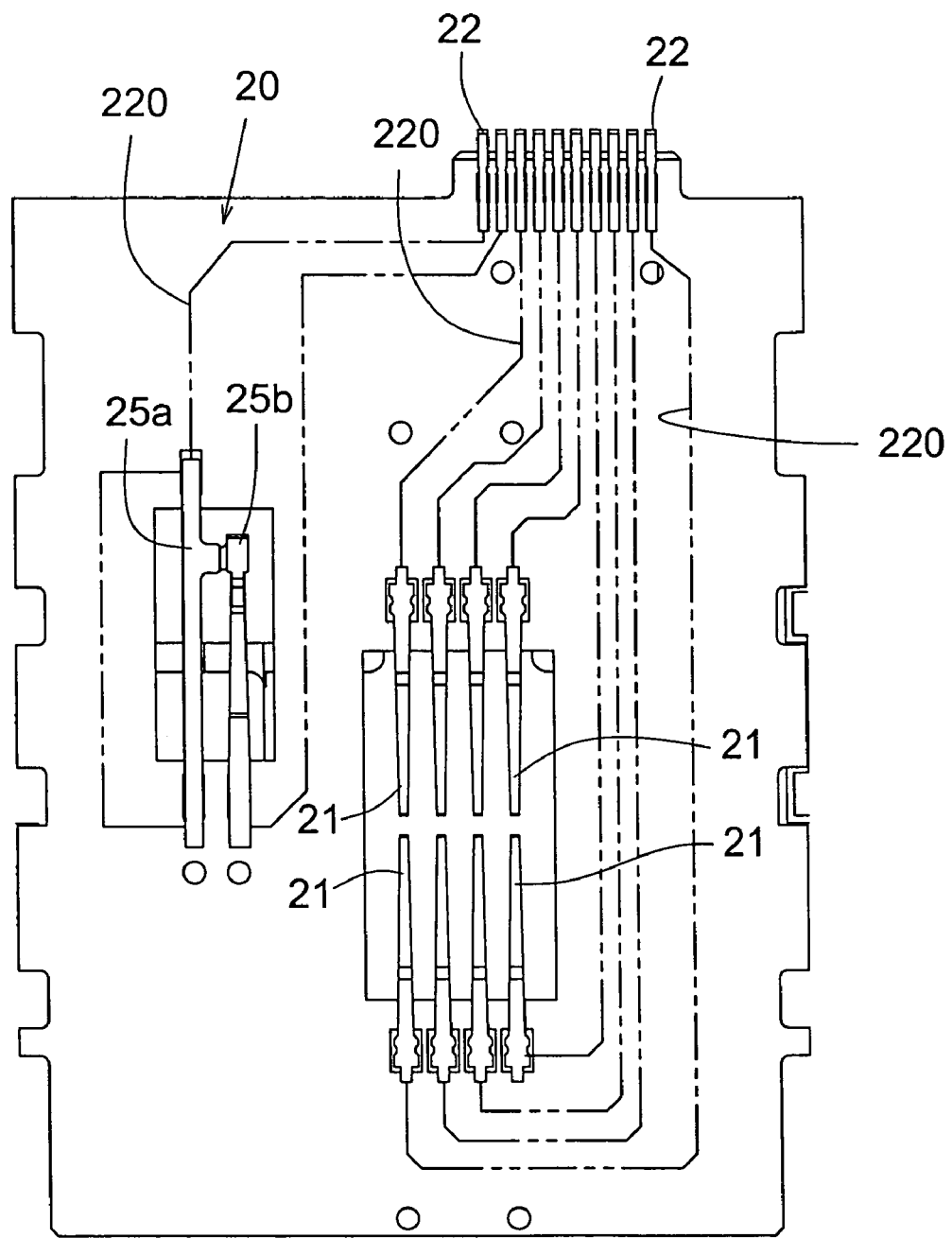
FIG. 9 shows the layout of the printed circuits between the contact terminals and adaptive terminals on the circuit board.

Referring to FIGS. 1 and 7, the plastic main body 10 is further formed with multiple grooves 15. After the circuit board 20 is placed into the circuit board receiving region 10b, the adaptive terminals 22 of the circuit board 20 are inlaid in the grooves 15.

The circuit board 20 further has a pair of test terminals 25a, 25b. In normal state, the test terminals 25a, 25b are opened (or closed). One end of each test terminal is connected to an adaptive terminal 22 via printed circuit. One end of one test terminal 25b is a free end extending into the electronic card receiving region 10a. When an electronic card 30 is inserted into the electronic card receiving region 10a, the free end of the test terminal 25b is drivingly pushed to contact with the other test terminal 25a. At this time, the pair of test terminals 25a, 25b are closed (or opened). Accordingly, a user can judge whether the electronic card 30 has been inserted in a true position and start transmitting the data of the electronic card 30 to the card reader.

Referring to FIGS. 5 to 8, the electronic card connector of the present invention further includes a fixing member 40 having a first board body 41. Multiple resilient latch hooks 411 downward project from bottom side of the first board body 41. The latch hooks 411 are latched in corresponding latch holes 16 of the plastic main body 10. An edge 412 of the first board body 41 abuts against an edge of the circuit board 20 extending out of the circuit board receiving region 10b so as to stop the circuit board 20 from sliding out of the circuit board receiving region 10b. The fixing member 40 further has a second board body 42 integrally connected with another edge of the first board body 41. An inner side of the second board body 42 is formed with multiple press ribs 421. When the fixing member 40 is latched on the plastic main body 10, the press ribs 421 of the second board body 42 respectively correspondingly press outer sides of upper sections of the adaptive terminals 22 of the circuit board 20. The rear sections of the adaptive terminals 22 are exposed to outer side. Accordingly, the adaptive terminals 22 are tightly fixedly clamped between the grooves 15 of the plastic main body 10 and the second board body 42 of the fixing member 40.

The inner side of the first board body 41 is further formed with multiple grooves 413. When the fixing member 40 is latched on the plastic main body 10, the first board body 41 presses rear end of the circuit board 20 and the adaptive terminals 22 are respectively correspondingly inlaid in the grooves 413.

An insulating sheet 26 is overlaid on outer face of the circuit board 20 to cover and protect the contact terminals 21, test terminals 25a, 25b and the printed circuits of the circuit board 20 from being touched or damaged by alien article and avoid short circuit.

Figure 6:
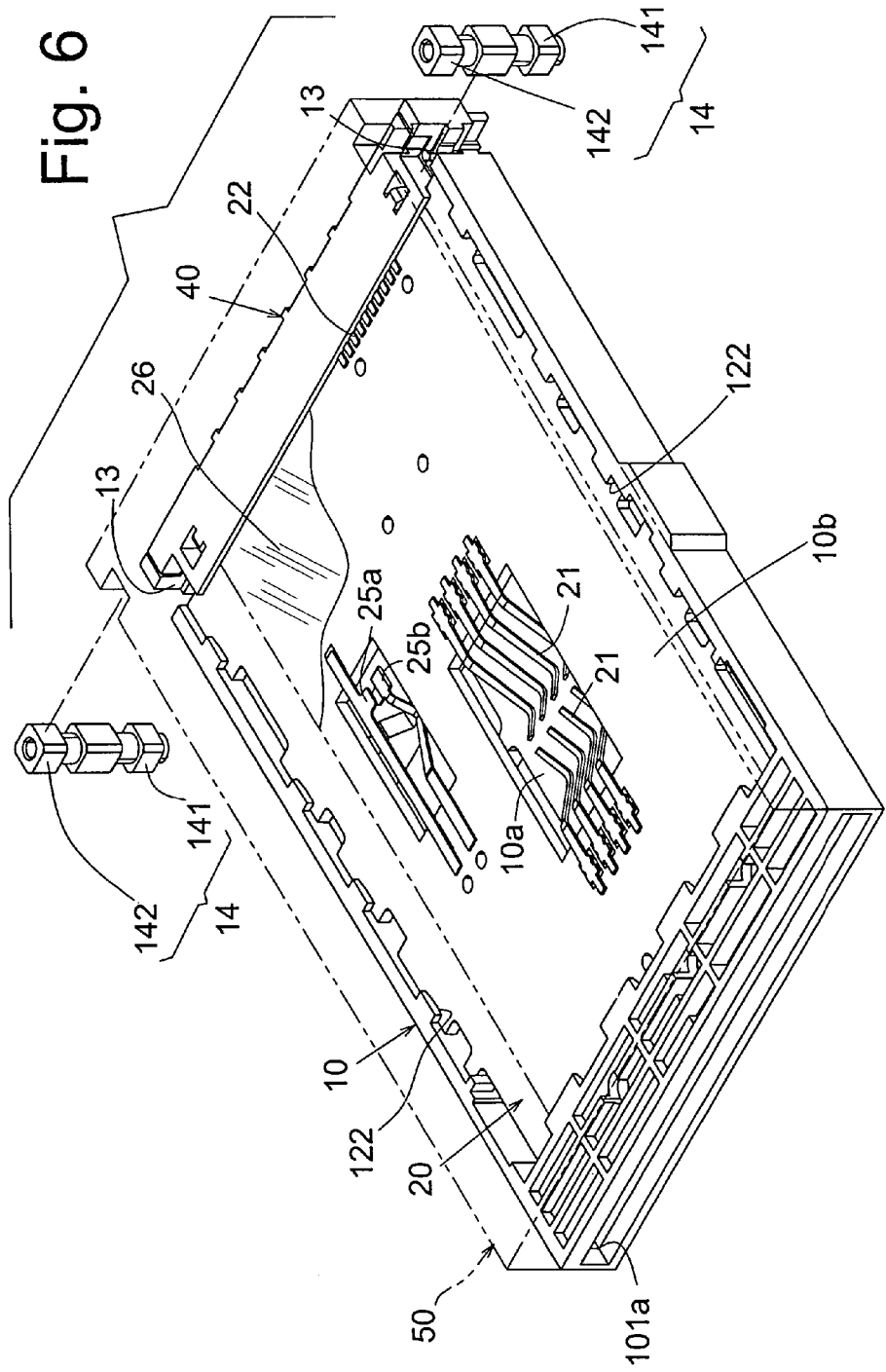
FIG. 6 is a perspective view showing that the electronic card connector of the present invention is connected with another type of electronic card connector via connecting members.

Referring to FIG. 6, a lateral side of the plastic main body 10 is formed with multiple insertion cavities 13. A first end 141 of a connecting member 14 is correspondingly latched in the insertion cavity 13. A second end 142 of the connecting member 14 is latched with another type of electronic card connector 50 such as an electronic card connector 50 in which a PCMCIA (Personal Computer Memory Card International Association) card is inserted. Accordingly, a double-layer connector can be formed. The electronic card connector 50 can be bridged over the plastic main body 10 of the present invention. When a card bus is inserted, the entrance 101a of the electronic card receiving region 10a of the electronic card connector of the present invention will not be hindered. Therefore, two different types of electronic cards can be at the same time inserted into the electronic card connector.

The circuit board 20 is slid and latched in the plastic main body 10 for contacting with an electronic card. It is easy and fast to assemble/disassemble the circuit board. In addition, the fixing member 40 is latched on the plastic main body 10 for firmly clamping the adaptive terminals 22 of the circuit board 20. When the adaptive terminals 22 are inserted into the sockets of the card reader, the adaptive terminals 22 are protected from being deformed.

The above embodiments are only used to illustrate the present invention, not intended to limit the scope thereof. Many modifications of the above embodiments can be made without departing from the spirit of the present invention.

What is claimed is:

1. An electronic card connector comprising:
 (a) a plastic main body having a carrier board section, two sidewalls being respectively connected with two sides of the carrier board section, a pair of electronic card receiving channels being respectively oppositely formed on the two sidewalls, an electronic card receiving region being defined between the electronic card receiving channels of the two sidewalls, an entrance of the electronic card receiving region being formed at front end of the plastic main body, a circuit board receiving region being defined between the two sidewalls; and
 (b) a circuit board disposed in the circuit board receiving region, multiple contact terminals being connected with the circuit board, one end of each contact terminal extending into the electronic card receiving region for contacting with a corresponding contact of an electronic card inserted in the electronic card receiving region, multiple adaptive terminals being disposed on one edge of the circuit board, a first end of each adaptive terminal being connected to a corresponding contact terminal via a printed circuit;
 wherein at least one resilient arm is disposed on the carrier board section of the plastic main body, the resilient arm always pushing the electronic card inserted in the electronic card receiving region toward the circuit board.

2. The electronic card connector as claimed in claim 1, wherein an upper channel wall of each second slide channel of the sidewall of the plastic main body is recessed from inner edge to form at least one recessed section, each lateral edge of the circuit board being formed with at least one projecting tongue plate, whereby the tongue plate can be projectively fitted into the recessed section of the second slide channel, with the tongue plates of circuit board aligned with the second slide channels, the circuit board being slid along the second slide channel through a certain distance and then the tongue plates being pressed by the upper channel walls of the second slide channels and firmly located in the second slide channels.

3. The electronic card connector as claimed in claim 1, wherein the plastic main body is further formed with multiple grooves, whereby after the circuit board is placed into the circuit board receiving region, the adaptive terminals of the circuit board are inlaid in the grooves.

4. The electronic card connector as claimed in claim 1, wherein the circuit board further has a pair of test terminals, in normal state, the test terminals being opened, one end of each test terminal being connected to an adaptive terminal via printed circuit, one end of one of the test terminals being a free end extending into the electronic card receiving region, when an electronic card is inserted into the electronic card receiving region , the free end of the test terminal being drivingly pushed to contact with the other test terminal, whereby the pair of test terminals are closed.

5. The electronic card connector as claimed in claim 1, wherein further comprising a fixing member having a first board body, multiple resilient latch hooks downward projecting from bottom side of the first board body, the latch hooks being latched in corresponding latch holes of the plastic main body, an edge of the first floor body abutting against an edge of the circuit board extending out of the circuit board receiving region so as to stop the circuit board from sliding out of the circuit board receiving region, the fixing member further having a second board body integrally connected with another edge of the first board body, an inner side of the second board body being formed with multiple press ribs, whereby when the fixing member is latched on the plastic main body, the press ribs of the second board body respectively correspondingly press outer sides of upper sections of the adaptive terminals of the circuit board, the rear sections of the adaptive terminals being exposed to outer side.

6. The electronic card connector as claimed in claim 5, wherein inner side of the first board body is further formed with multiple grooves, whereby when the fixing member is latched on the plastic main body, the first board body presses rear end of the circuit board and the adaptive terminals are respectively correspondingly inlaid in the grooves.

7. An electronic card connector comprising:
a plastic main body having a carrier board section, two sidewalls being respectively connected with two sides of the carrier board section, a pair of electronic card receiving channels being respectively oppositely formed on the two sidewalls, an electronic card receiving region being defined between the electronic card receiving channels of the two sidewalls, an entrance of the electronic card receiving region being formed at front end of the plastic main body, a circuit board receiving region being defined between the two sidewalls a lateral side of the plastic main body being formed with multiple insertion cavities, a first end of a connecting member being correspondingly latched in each insertion cavity, a second end of the connecting member being latched with another type of electronic card connector; and
a circuit board disposed in the circuit board receiving region, multiple contact terminals being connected with the circuit board, one end of each contact terminal extending into the electronic card receiving region for contacting with a corresponding contact of an electronic card inserted in the electronic card receiving region, multiple adaptive terminals being disposed on one edge of the circuit board, a first end of each adaptive terminal being connected to a corresponding contact terminal via a printed circuit.

8. An electronic card connector comprising:
a plastic main body having a carrier board section, two sidewalls being respectively connected with two sides of the carrier board section, a pair of electronic card receiving channels being respectively oppositely formed on the two sidewalls, an electronic card receiving region being defined between the electronic card receiving channels of the two sidewalls, an entrance of the electronic card receiving region being formed at front end of the plastic main body, a circuit board receiving region being defined between the two sidewalls; and
a circuit board disposed in the circuit board receiving region, multiple contact terminals being connected with the circuit board, one end of each contact terminal extending into the electronic card receiving region for contacting with a corresponding contact of an electronic card inserted in the electronic card receiving region, multiple adaptive terminals being disposed on one edge of the circuit board, a first end of each adaptive terminal being connected to a corresponding contact terminal via a printed circuit, the circuit board further having a pair of test terminals, the test terminals being closed in normal state, one end of each test terminal being connected to an adaptive terminal via printed circuit, one end of one of the test terminals being a free end extending into the electronic card receiving region, when an electronic card is inserted into the electronic card receiving region, the free end of the one test terminal being drivingly pushed into contact with the other test terminal, whereby the pair of test terminals are opened.

9. The electronic card connector as claimed in claim 8, wherein an insulating sheet is overlaid on an outer face of the circuit board to cover and protect the contact terminals, test terminals and the printed circuits of the circuit board.

* * * * *